United States Patent
Rathnavelu et al.

(10) Patent No.: US 8,917,953 B2
(45) Date of Patent: Dec. 23, 2014

(54) METHOD AND SYSTEM TO PERFORM DYNAMIC LAYOUT OF PHOTOGRAPHS

(71) Applicant: RealNetworks, Inc., Seattle, WA (US)

(72) Inventors: Kadir Rathnavelu, Bellevue, WA (US); Jeff Leitner, Shoreline, WA (US); Jackie Nowell, Seattle, WA (US); Christine McKee, Seattle, WA (US); Steve Blanding, Redwood, WA (US)

(73) Assignee: RealNetworks, Inc., Seattle, WA (US)

( * ) Notice: Subject to any disclaimer, the term of this patent is extended or adjusted under 35 U.S.C. 154(b) by 64 days.

(21) Appl. No.: 13/662,167

(22) Filed: Oct. 26, 2012

(65) Prior Publication Data

US 2014/0119673 A1    May 1, 2014

(51) Int. Cl.
*G06K 9/36*    (2006.01)

(52) U.S. Cl.
USPC ........................................................ 382/284

(58) Field of Classification Search
USPC .......... 382/284, 283, 291, 305; 715/243–253; 345/156, 173, 619, 634, 635; 358/1.15, 358/1.18
See application file for complete search history.

(56) References Cited

U.S. PATENT DOCUMENTS

| | | | |
|---|---|---|---|
| 6,636,648 B2 * | 10/2003 | Loui et al. ..................... | 382/284 |
| 7,715,586 B2 * | 5/2010 | Issa et al. ....................... | 382/100 |
| 8,238,667 B2 * | 8/2012 | Hosaka et al. ................. | 382/217 |
| 2012/0206496 A1 * | 8/2012 | Cok ............................... | 345/672 |

* cited by examiner

*Primary Examiner* — Yon Couso
(74) *Attorney, Agent, or Firm* — ÆON Law; Adam L.K. Philipp

(57) ABSTRACT

Disclosed is a layout software routine which automatically creates complex and aesthetically pleasing layouts without any user interaction, though user interaction is possible.

20 Claims, 4 Drawing Sheets

METHOD AND SYSTEM TO PERFORM DYNAMIC LAYOUT OF PHOTOGRAPHS

BACKGROUND INFORMATION

Digital photography makes it possible for people to take hundreds, even thousands, of digital photographs, without the time and expense of developing negatives and prints from film. However, organizing and viewing a large volume of digital photographs has become a challenge. This creates a problem in terms of arranging the photographs in layouts.

Existing software applications (also referred to herein as "routines") exist which allow professionals and enthusiastic amateurs to create complex layouts with customized backgrounds, boarders, user-specified photograph orientation and size, and user-specified photograph selections. However, such complex layout routines present a bewildering array of options to the uninitiated user. Alternatives exist, such as IPHOTO® by Apple, Inc., which allows "albums" (groups of photographs specified by users) to be presented in "slide-shows" or "Photo Journals." To create a "Photo Journal" in IPHOTO®, the user selects photographs and one of six layouts. The photographs are arranged in a grid within the selected layout; the user can move, enlarge, edit, or remove photographs from the selected layout; the order of the photographs will be changed, without user interaction, if the user resizes a photo or manually changes the order of photos in the layout.

While a step toward addressing the need for software which arranges photographs in layouts, the existing products still require significant user interaction to prepare the layout, the user must select the layout template, and the selected layout repeats without variation as the number of selected photographs exceeds the number of positions in the selected template.

Needed is a system which addresses the shortcomings discussed above.

SUMMARY

Disclosed is a layout software routine which automatically creates complex and aesthetically pleasing layouts without any user interaction, though user interaction is possible.

DETAILED DESCRIPTION

The following description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list.

Figure 1:
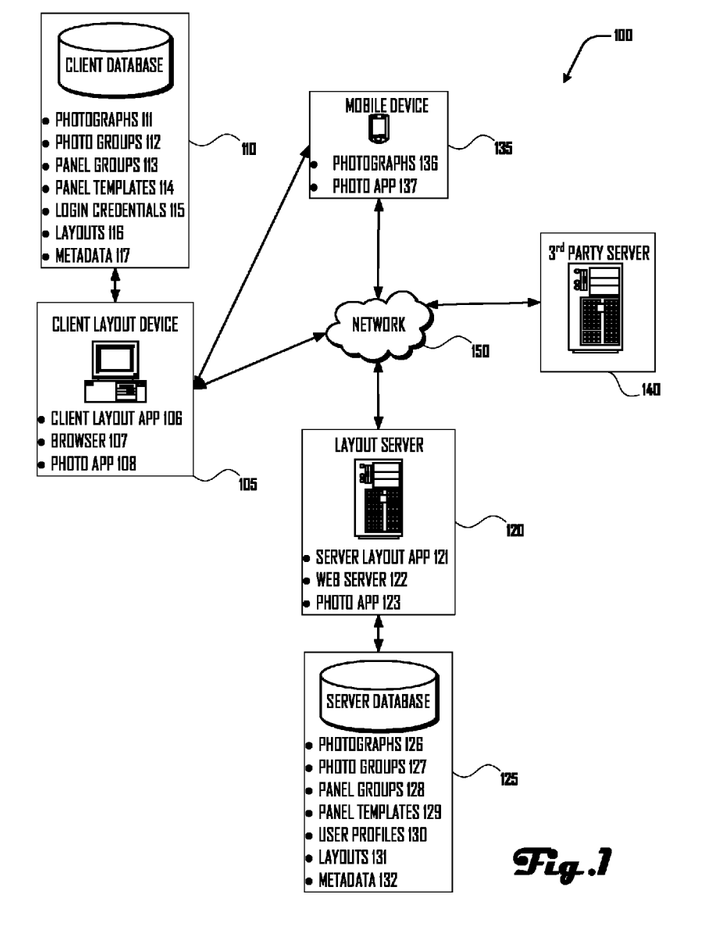
FIG. 1 is a network and device diagram illustrating exemplary computing devices configured according to embodiments disclosed in this paper.

FIG. 1 is a network and device diagram illustrating exemplary computing devices configured according to embodiments disclosed in this paper. In FIG. 1, a Client Layout Device 105 computer is connected to a Network 150, such as the Internet. The Network 150 comprises computers and network connections. Also illustrated in FIG. 1, a Mobile Device 135 computer is connected to the Network 150 and to the Client Layout Device 105. The Client Layout Device 105 and the Mobile Device 135 are both referred to herein as a "Client Device" and should be understood herein to be equivalent computing devices; the two are illustrated as separate devices in FIG. 1 for the purpose of showing that a user may utilize a Mobile Device 135 to take photographs, such as Photographs 131, and that the user may transmit Photographs 131 to the Client Layout Device 105 through the direct connection between the Client Layout Device 105 and the Mobile Device 135 and/or through the Network 150. Also illustrated in FIG. 1, a Layout Server 120 computer is connected to the Network 150. The Layout Server 120 and the Client Devices should be understood herein to be equivalent computing devices. The Layout Server 120 is illustrated as a separate device from the Client Devices for the purpose of illustrating that the system and method discussed herein in relation to the Client Devices may be performed in a client-server architecture, in which the Layout Server 120 prepares Layouts which are rendered by a Client Device. Except as required by the context, references herein to either of the Client Devices and to the Layout Server should be understood to refer to any of these devices. The computers shown in FIG. 1 are further described in relation to FIG. 4.

As illustrated in FIG. 1, the Client Layout Device 105 may comprise software routines for a Client Layout Application 106, a web-browsing application, Browser 107, and a Photo Application 108 while the Layout Server 120 may comprise software routines for a Server Layout Application 121, a web-server for serving webpages, Web Server 122, and a Photo Application 123. The Photo Applications may be applications for storing and organizing photographs, such as Photographs 111 and 126. Examples of Photo Applications include IPHOTO® by Apple, Inc., and PICASA® by Google, Inc. Both the Browser 107 and the Client Layout Application 106 may provide an interface for interacting with the Layout Server 101, for example, through the Webserver 122 (which may serve data and information in the form of webpages as well as to the Client Layout Application 106). Connection to the Layout Server 120 from a Client Device may be through the Browser 107 and/or through the Client Layout Application 106 (which may use a web browsing application as an interface). Login credentials and local instances of user profiles, such as Login Credentials 115, may be stored in or be accessible to the client device. The Client Layout App 106 may be stored and executed remotely relative to the Client Device, with the user provided access via application virtualization, such as remote terminal services, and/or, for example, through a web browser.

FIG. 1 illustrates the Client Layout Device 105 and Layout Server 120 as being connected to a Client Database 110 and Server Database 125. This paper discusses components as connecting to the Client Device 105 or to the Client Database 110 (or to the Layout Server 120 or to the Server Database 125); it should be understood that such connections may be to, through, or via the other of the two components (for example, a statement that a computing device connects with or sends data to the Client Layout Device 105 should be understood as saying that the computing device may connect with or send data to the Client Layout Device 105 and/or the Client Database 110). Although illustrated as separate components, the servers and databases may be provided by common (or separate) physical hardware and common (or separate) logic processors and memory components.

As illustrated in FIG. 1, the Client Database 110 comprises database records for Photographs 11, Photo Groups 112, Panel Groups 113, Panel Templates 114, Login Credentials 115, Layouts 116, and Metadata 117. Similarly, the Server Database 125 is illustrated as comprising records for Photographs 126, Photo Groups 127, Panel Groups 128, Panel Templates 129, User Profiles 130, Layouts 131, and Metadata 132. Elements with the same capitalized name in the different devices are the same and are described herein without element number; the elements Client Layout Application 106 and Server Layout Application 121 when referred to herein as "Layout Application" shall refer to either of such applications. All of the database records may be represented by a cell in a column or a value separated from other values in a defined structure. Though referred to as individual records, the records may comprise more than one database entry. The database entries may be, represent, or encode numbers, binary values, logical values, text, or similar.

Photographs are digitally encoded photographs and may comprise, for example, database entries comprising photographs encoded in a digital format, such as a "raw" image file, a TIFF, JPEG, GIF, BMP, PNG, RGBE, IFF-RGFX, CGM, Gerber Format, SVG, and other digital image formats. Photographs may be associated in the Databases with Layouts. Photographs may comprise or be associated with Metadata. Metadata may comprise database entries comprising camera settings, time and date (together referred to herein as a "timestamp"), shutter speed, exposure (such as f-stop), image size (in pixels, distance units, or quantity of data), image orientation, such as portrait or landscape, compression, the camera name, the camera type, captions or other text associated with the photograph, and location (such as a latitude and longitude). Metadata may be formatted according to a standard, such as, for example, the International Press Telecommunications Council ("IPTC") Information Interchange Model, the IPTIC Core Schema for XMP, Extensible Metadata Plaform ("XMP"), Exchangeable image file format ("Exif"), Dublin Core Metadata initiative, or Picture Licensing Universal System.

The Photo Groups illustrated in FIG. 1 are database entries representing groups of Photographs organized into "albums" or "folders." The Photo Groups may be created by users and/or by applications such as the Photo Application. The Photo Group database entries may record the order of Photographs within the Photo Group as well as a name which may have been given to the Photo Group (either by the user or by, for example, a Photo Application).

The Panel Groups illustrated in FIG. 1 are groups of Panel Templates utilized by the Client Layout Application 106 and the Server Layout Application 121 in a process discussed further herein. The Panel Groups have a Panel Group Number equal to the number of cells for Photographs in each of the Templates within the Panel Group. A table illustrating an example of sets of Panel Groups and Panel Templates follows as Table 1. The third column in the table comprises cells and the attributes.

TABLE 1

| Panel Group Number | Template Number | Cell in template and attributes (orientation [portrait/landscape]; width [pixels]; height [pixels]; caption [yes/no]) |
|---|---|---|
| 1 | 0 | landscape; 600; 625; yes |
|   | 1 | portrait; 410; 625; yes |
| 2 | 0 | landscape; 450; 300; yes |
|   |   | landscape; 450; 300; yes |
|   | 1 | portrait; 300; 420; yes |
|   |   | landscape; 300; 180; no |
|   | 2 | landscape; 300; 180; no |
|   |   | portrait 300; 420; yes |
|   | 3 | portrait; 200; 300; no |
|   |   | portrait; 200; 300; no |
| 3 | 0 | landscape; 300; 195; yes |
|   |   | landscape; 300; 195; yes |
|   |   | landscape; 300; 195; yes |
|   | 1 | landscape; 200; 105 no |
|   |   | portrait; 200; 240; no |
|   |   | portrait; 200; 240; no |
|   | 2 | portrait; 200; 240; no |
|   |   | landscape; 200; 105; no |
|   |   | portrait; 200; 240; no |
|   | 3 | portrait; 200; 240; no |
|   |   | portrait; 200; 240; no |
|   |   | landscape; 200; 105; no |

TABLE 1-continued

| Panel Group Number | Template Number | Cell in template and attributes (orientation [portrait/landscape]; width [pixels]; height [pixels]; caption [yes/no]) | | |
|---|---|---|---|---|
| | 4 | landscape; 200; 140; no | | |
| | | landscape; 200; 140; no | | |
| | | portrait; 200; 305; yes | | |
| | 5 | portrait; 200; 305; yes | | |
| | | landscape; 200; 140; no | | |
| | | landscape; 200; 140; no | | |
| | 6 | landscape; 625; 410; yes | | |
| | | landscape; 300; 190; no | landscape; 300; 190; no | |
| | 7 | portrait; 400; 475; yes | | |
| | | landscape; 190; 125, no | landscape; 190; 125, no | |
| | 8 | landscape; 600; 350; yes | | |
| | | landscape; 385; 250; no | portrait; 190; 250; no | |
| | 9 | landscape; 385; 250; no | portrait; 190; 250; no | |
| | | landscape; 600; 350; yes | | |
| | 10 | portrait; 320; 415; yes | | |
| | | portrait; 140; 190; no | portrait; 140; 190; no | |
| 4 | 0 | landscape; 500; 305; yes | | |
| | | portrait; 230; 300; yes | landscape; 250; 140; no | |
| | | | landscape; 250; 140; no | |
| | 1 | portrait; 230; 300; yes | landscape; 250; 140; no | |
| | | | landscape; 250; 140; no | |
| | | landscape; 500; 305; yes | | |
| | 2 | landscape; 500; 350; yes | | |
| | | portrait; 150; 250; no | portrait; 150; 250; no | portrait; 150; 250; no |
| | 3 | portrait; 150; 250; no | portrait; 150; 250; no | portrait; 150; 250; no |
| | | landscape; 500; 350; yes | | |
| | 4 | portrait; 250; 290; yes | | |
| | | portrait; 115; 140; no | portrait; 115; 140; no | |
| | | landscape; 250; 155; no | | |
| | 5 | portrait; 115; 140; no | portrait; 115; 140; no | |
| | | portrait; 250; 290; yes | | |
| | | landscape; 250; 155; no | | |
| | 6 | portrait; 115; 140; no | portrait; 115; 140; no | |
| | | landscape; 250; 155; no | | |
| | | portrait; 250; 290; yes | | |
| | 7 | landscape; 375; 250; yes | landscape; 375; 250; yes | |
| | | landscape; 500; 355; yes | landscape; 500; 355; yes | |
| | 8 | portrait; 215; 305; yes | portrait; 215; 305; yes | |
| | | portrait; 185; 300; yes | portrait; 215; 300; yes | |
| | 9 | landscape; 450; 305; yes | landscape; 380; 305; yes | |
| | | landscape; 380; 300; yes | landscape; 450; 300; yes | |
| 5 | 0 | landscape; 240; 140; no | landscape; 240; 140; no | |
| | | landscape; 500; 305; yes | | |
| | | landscape; 240; 140; no | landscape; 240; 140; no | |
| | 1 | landscape; 490; 330; yes | landscape; 490; 330; yes | |
| | | portrait; 250; 275; no | landscape; 460; 275; yes | portrait; 250; 275; no |
| | 2 | landscape; 490; 330; yes | landscape; 490; 330; yes | |
| | | landscape; 320; 275; no | landscape; 320; 275; no | landscape; 320; 275; no |
| | 3 | landscape; 490; 300; yes | landscape; 490; 300; yes | |
| | | landscape; 365; 305; yes | portrait; 230; 305; no | landscape; 365; 305; yes |
| | 4 | portrait; 265; 370; yes | portrait; 265; 370; yes | |
| | | portrait; 170; 235; yes | portrait; 170; 235; yes | portrait; 170; 235; yes |

Also illustrated in FIG. 1 are database records for Layouts (116 and 131). Layouts are sets of Photographs in Photo Groups which have been inserted into the Panel Templates in the Panel Groups, according the process outlined further herein.

Also illustrated in FIG. 1 is a $3^{rd}$ Party Server 140. The $3^{rd}$ Party Server 140 may be an online service, such as a service which stores and organizes photographs, such as Google, Inc.'s PICASA® service or Facebook, Inc.'s FACEBOOK® service. Such services shall be referred to herein as an "Online Service." The Layout Applications discussed herein may obtain Photographs and Photo Groups from Online Services, such as by registering with the Online Service with permissions and credentials to obtain Photographs and Photo Groups associated with a user.

Figure 2:
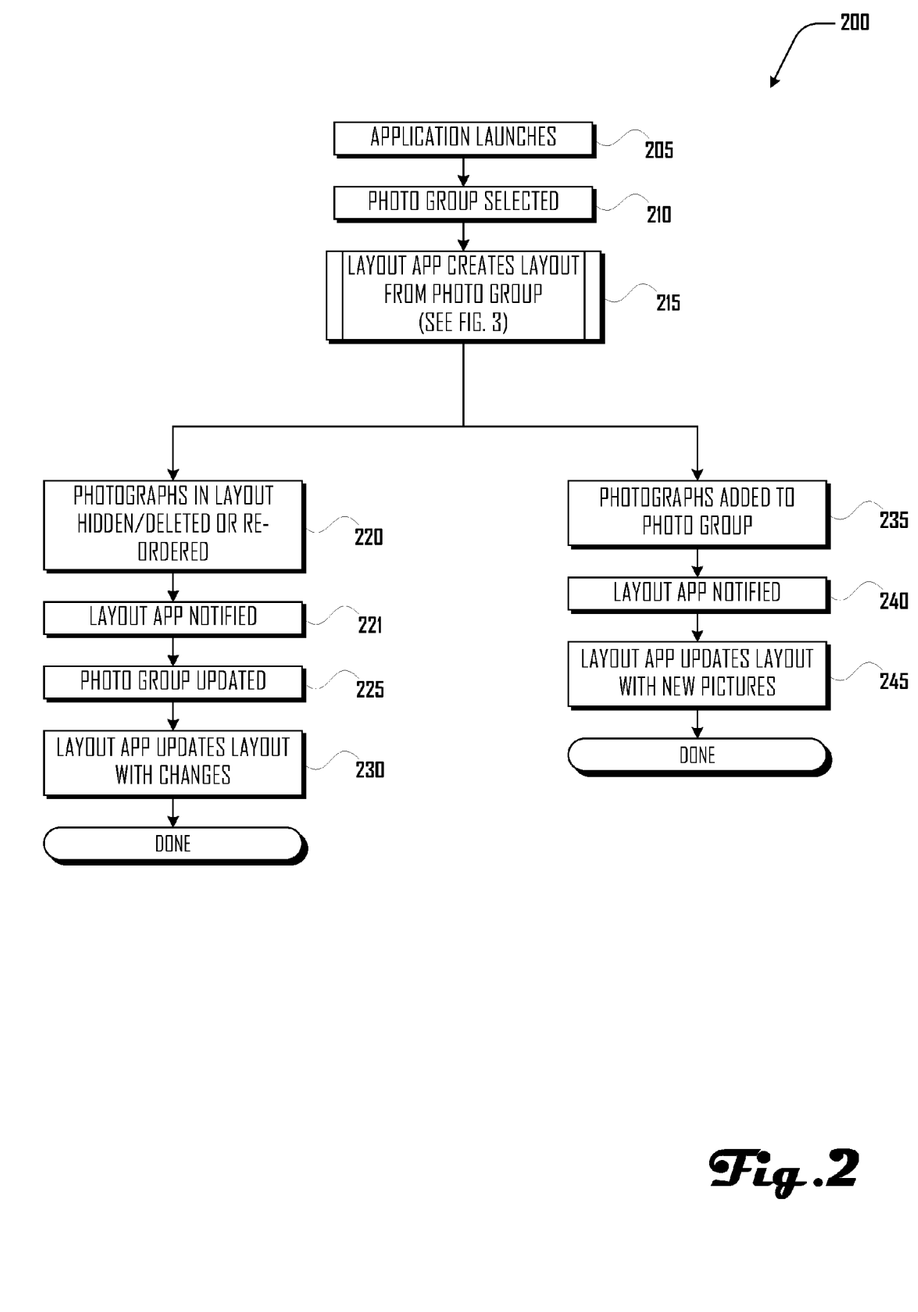
FIG. 2 is a flowchart illustrating an overview of a process to automatically create a photograph Layout according to embodiments disclosed in this paper.

FIG. 2 is a flowchart illustrating an overview of a process to automatically create a photograph layout, or Layout, according to embodiments disclosed in this paper. At step 205, the Layout Application launches or otherwise continues to execute. At step 210, the a Photo Group is selected to be used to prepare a Layout; the Photo Group may be selected by a user or the Photo Group may be selected programmatically, such as by the Layout Application or by another routine or application which utilizes the Layout Application to prepare Layouts. At step 215, the Layout Application creates a Layout utilizing the Photographs, Panel Groups, and Panel Templates. The process for doing so is expanded on in FIG. 3.

At step 220 the user has hidden or deleted Photographs in the Layout, the user has re-ordered Photographs in the Layout, or another application or data source has re-ordered the content of the Photo Group. User actions to hide, delete, or re-order Photographs in the Photo Group may be enabled by, for example, a graphical control object rendered in conjunction with the Layout, which graphical control object provides a way to communicate a "hide" or "delete" command from the user to the Layout Application or which provides a "handle" which the user can use to drag-and-drop a Photograph in the Layout to a new location in the Layout. Alternatively, another application or data source, such as the Photo Application or an Online Service from which the Photo Group was obtained may change the Photographs and/or the order of the Photographs in the Photo Group, in which case the Layout Application may receive notification of the change, such as at optional step 221. The notification may consist of a notification concerning the content of the Photo Group and a check by the Layout Application that the Photo Group has been changed relative to its earlier content.

At step 225, the Photo Group from which the Layout was prepared is updated by the Layout Application, such as to remove Photographs from the Photo Group or to change the order of Photographs within the Photo Group. At step 230, the Layout Application updates the Layout, by re-executing the process outlined in FIG. 3, utilizing the updated Photo Group. Because the process outlined in FIG. 3 is re-executed, the revised Layout may be differ considerably from the original Layout, such as by more than relocating a Photograph within the Layout.

At step 235, Photographs have been added to the Photo Group. The Photographs may have been added by the user interacting directly with the Photo Group via the Layout Application or the Photographs may have been added to the Photo Group by the Photo Application or the Photo Group may have been obtained from an Online Service and the Photo Group may have been changed at or by the Online Service. At step 240, the Layout Application receives notification that the Photographs were added to the Photo Group. The notification may consist of a push or pull notification concerning the content of the Photo Group and a check by the Layout Application that the Photo Group has been changed relative to its earlier content. At step 245, the Layout Application updates the Layout, by executing the process outlined in FIG. 3, utilizing the updated Photo Group beginning with the new Photographs. Because, in this instance, Photographs are being added to the Photo Group and the Photographs and order of Photographs in the Photo Group has not changed, the original Layout remains the same, with the new Photographs added to the end of the existing Layout, according to the process outlined in FIG. 3.

Figure 3:
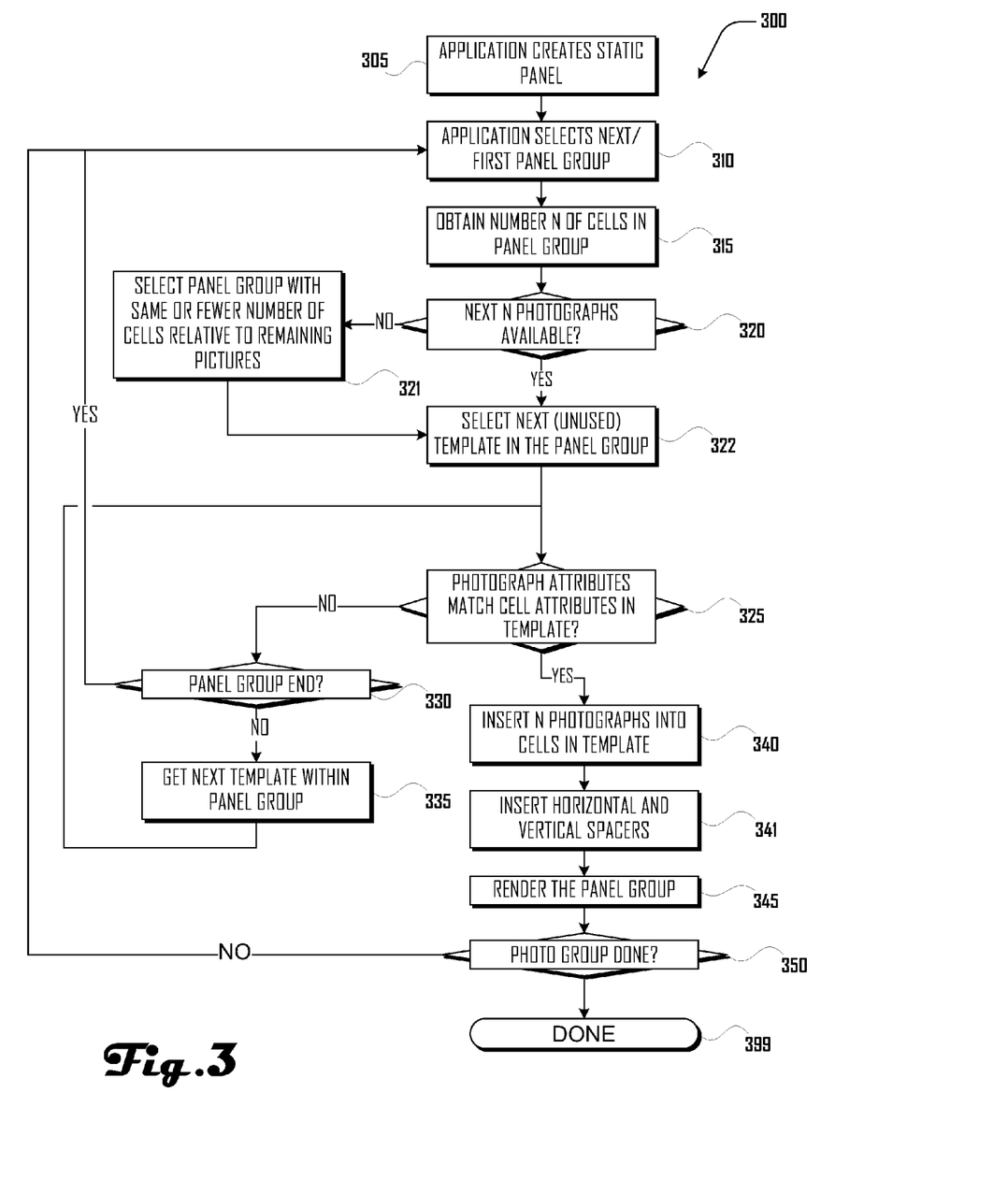
FIG. 3 is a flowchart illustrating a detail of a process which may be included in the process illustrated in FIG. 2, in which a photograph Layout is created.

FIG. 3 is a flowchart illustrating a detail of a process which may be included in the process illustrated in FIG. 2, in which a photograph Layout is created. At step 305, the Layout Application optionally creates a "static" panel containing, for example, the name of the Photo Group, a description of the Photo Group provided by the user, a date of the Photo Group (or the range of dates found in Metadata for Photographs in the Photo Group), a location where Photographs in the Photo Group were taken (as may be found in Metadata for Photographs in the Photo Group) and a Photograph from the Photo Group (such as the first Photograph in the Photo Group). The "static" panel is not shown in Table 1.

At step 310, the Layout Application selects the next unused Panel Group from a set of Panel Groups, such as the example provided in Table 1. For a first run through this process, the "next unused Panel Group" will be Panel Group 1; for subsequent runs through this process (which have not termated at step 399), the "next unused Panel Group" will be the next Panel Group in the set in numerical order after the Panel Group which was previously selected; if all the Panel Groups have been previously selected, then the "next unused Panel Group" starts over with the first Panel Group, Panel Group 1.

At step 315, the Layout Application obtains the number N of cells in the then-currently selected Panel Group. Because the Panel Groups have a number of cells equal to the Panel Group Number, obtaining the number N of cells in the then-currently selected Panel Group may comprise obtaining the then-currently selected Panel Group Number.

At step 320, the Layout Application makes an optional determination regarding whether the number of Photographs remaining the Photo Group is equal to or larger than the then-currently selected Panel Group Number. This step may be optional when, for example, the determination will always return true, such as during the first pass through the process, in which case the first Panel Group will be selected and in which case the Photo Group has at least one picture. At step 321, if the determination at step 320 was negative (that the number of Photographs remaining the Photo Group is not equal to or larger than the then-currently selected Panel Group Number), then the Layout Application selects a Panel Group with a Panel Group Number which is less than or equal to the number of Photographs remaining the in the Photo Group.

At step 322, the Layout Application selects the next Template in the then-currently selected Panel Group. Selection of the next Template may be the next unused Template, disregarding Templates in the Panel Group which were previously used during iterations of the process outlined in FIG. 3 and starting over at the first Template in the Panel Group when all the Templates in the Panel Group have previously been used.

At step 325, the Layout Application may make a determination regarding whether the attributes of the next N Photographs in the Photo Group match the attributes of the cells in then-currently selected Template within the then-currently selected Panel Group. The attribute comparison may be based on attributes such orientation and whether the orientation of the Photograph matches the orientation of a cell. Orientation may be based on "portrait" or "landscape" orientation; orientation determination may be based on whether the ratio of a Photograph's dimensions is within a range of the ratio of the cell dimensions in the Template. The attribute comparison may further determine whether a Photograph and a cell both have a caption. The attribute comparison may be based on the order of the Photographs in the Photo Group and the order of the cells in the Template (the order of cells starting at the cell in the top left of a Template, proceeding to cells to the right along the row, then down one row to the left-most cell, proceeding to cells to the right along the row, then down one row to the left-most cell, etc.).

At step 340, the outcome of step 325 was positive (that there was a match between the Photograph attributes for the next N Photographs and the cell attributes for cells in the then-currently selected Template within the then-currently selected Panel Group) and the next N Photographs are inserted into the cells in the Template, forming a portion of a Layout (the Template is not used up, but remains, unchanged, as a Template in the process). When inserted into the cells in the Template (or when rendered at step 345), the Photographs may optionally be resized or down-sampled to or to approximate the dimensions of the cell (or a limited set of data consistent with the dimensions of the cell may be accessed) and a caption or similar associated with the Photograph may be inserted into a corresponding portion of a Template. At optional step 341, horizontal and vertical spaces may be inserted between cells in the Template and/or between two successive Templates from two successively chosen Panel Groups.

At step 330, a decision may be made regarding whether there are more as-of-then unused Templates within the then-currently selected Panel Group (being referred to in step 330 as a Panel Group end). If the outcome is negative (if there are unused Templates remaining in the Panel Group), then the process proceeds to step 335, wherein the Layout Application obtains the next Template within the then-currently selected Panel Group. Selecting the next Template may be the next Template based on the next Template Number in the Panel Group. For example, if the then-currently selected Panel Group was Panel Group 2, and the previously selected Template was Template Number 0, then the next Template Number in Panel Group 2 would be Template Number 1.

If the outcome of step 330 was affirmative (if there are no unused Templates remaining in the Panel Group), then the process then returns to step 310, whereupon the Layout Application selects the next (or the first, if the end of the Panel Group set has been reached) Panel Group and the process iterates.

At step 345 the N Photographs inserted into cells in the then-currently selected Template at step 340 may then, at step 345, be rendered as a partially completed Layout. Rendering may involve updating records in the Database to indicate the partially completed Layout and to indicate that the partially completed Layout is available to be rendered. As noted above, rendering may involve downsampling the Photograph (or only obtaining as much of the Photograph as required) to match the dimensions or resolution of the cell.

At step 350, a determination may be made regarding whether all the Photographs in the Photo Group have been organized into the Layout. If not, then the process may return to step 310 and continue to iterate until all of the Photographs in the Photo Group have been organized into the Layout. If the determination at step 350 is affirmative, then the process may conclude or proceed with other steps.

Because only a part of a Layout will typically be rendered in the display of a Client Device (the display having to scroll to show the entire Layout), the Layout Application may have sufficient time to compose the Photo Group into a Layout as the user scrolls across the Layout. Alternatively, Layouts may be prepared and stored as Layouts in advance.

By iterating through the Panel Groups and Templates within the Panel Groups, the process can always find a Panel Group Template which will match the attributes of Photographs in the Photo Group, because, at minimum, Panel Group 1, contains only two templates, for portrait and landscape orientation. Based on real-world evaluation of a wide range of Photographs which have unpredictable orientation, the process produces a large number of non-repeating, aesthetically pleasing Layouts.

Figure 4:
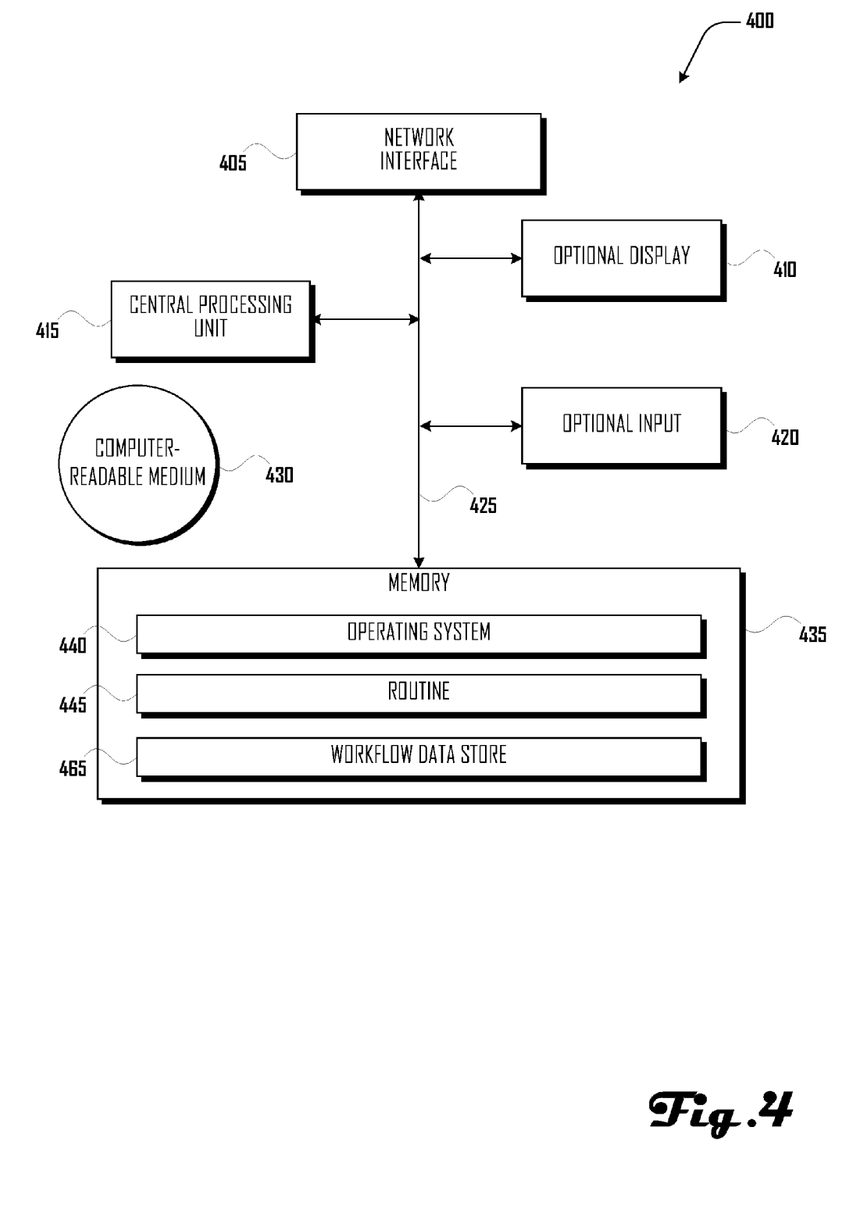
FIG. 4 is a functional block diagram of exemplary computing devices and some data structures and/or components thereof.

FIG. 4 is a functional block diagram of exemplary computing devices and some data structures and/or components thereof, such as the computing devices shown in FIG. 1. In some embodiments, the computing device 400 may include many more components than those shown in FIG. 4. However, it is not necessary that all of these generally conventional components be shown in order to disclose an illustrative embodiment. As shown in FIG. 4, the computing device 400 includes a network interface 430 for connecting to the Network 150.

The computing device 400 also includes at least one processing unit 415, memory 435, and an optional display 410, all interconnected along with the network interface 405 via a bus 425. The memory 435 generally comprises a random access memory ("RAM"), a read only memory ("ROM"), and a permanent mass storage device, such as a disk drive or SDRAM (synchronous dynamic random-access memory). The memory 435 stores program code for routines 445, such as, for example, the Client and Server Layout Applications (106, 121), as well as web browsing applications, web serving applications, email servers and client applications, and database applications. In addition, the memory 435 also stores an operating system 440. These software components may be loaded from a non-transient computer readable storage medium 430 into memory 435 of the computing device 400 using a drive mechanism (not shown) associated with a non-transient computer readable storage medium 430, such as a floppy disc, tape, DVD/CD-ROM drive, memory card, or other like storage medium. In some embodiments, software components may also or instead be loaded via a mechanism other than a drive mechanism and computer readable storage medium 430 (e.g., via network interface 405).

The computing device 400 may also comprise hardware supporting optional input modalities, Optional Input 420, such as, for example, a touchscreen, a keyboard, a mouse, a trackball, a stylus, a microphone, and a camera.

Computing device 400 also comprises or communicates via bus 425 with workflow data store 465. In various embodiments, bus 425 may comprise a storage area network ("SAN"), a high speed serial bus, and/or via other suitable communication technology. In some embodiments, computing device 400 may communicate with workflow data store 465 via network interface 405.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

The invention claimed is:

1. A method of preparing a layout of photographs in a computer comprising a memory, the method comprising:

obtaining in the memory a group of photographs, wherein the group of photographs comprises at least 15 photographs in an ordered sequence and wherein the photographs have an attribute of portrait orientation or an attribute of landscape orientation;

accessing in the memory a layout comprising a set of panel groups, wherein the set of panel groups are arranged by integer, panel groups 1 to 5, each panel group within the set comprising at least two templates for photographs, each template within each panel group comprising a number of cells for photographs, the number of cells in each template within each panel group being equal to the integer of the panel group, which cells have a set of cell attributes comprising at least a portrait or a landscape orientation of the cell, wherein the templates across the panel groups are distinct from one another, wherein panel group 1 comprises a panel group 1 first template cell attribute of landscape orientation and a panel group 1 second template cell attribute of portrait orientation, and wherein panel group 2 comprises four templates;

sequentially then by the computer:

a. determining if all of the photographs in the group of photographs have been inserted into templates within the panel groups and, when all of the photographs in the group of photographs have been inserted into templates within the panel groups, ending the method;

b. if not all of the pictures in the group of pictures have been inserted into templates within the panel groups, then going to step c;
c. selecting the next panel group from the set of panel groups according to the sequential integer order of the panel groups, except that panel group 1 follows panel group 5;
d. obtaining the integer of the selected next panel group;
e. determining if the number of unselected photographs remaining in the group of photographs is less than the integer of the selected next panel group;
f. if the number of unselected photographs remaining in the group of photographs is not less than the integer of the selected next panel group, then selecting a number of photographs from the group of photographs equal to the integer of the selected next panel group and going to step g, else if the number of unselected photographs remaining in the group of photographs is less than the integer of the selected next panel group, then selecting a next panel group with an integer equal to or less than the number of unselected photographs remaining in the group of photographs;
g. determining the attributes of the selected number of photographs;
h. selecting a next template within the selected next panel group;
i. determining if the attributes of the selected number of photographs match the attributes of the selected next template;
j. if the attributes of the selected number of photographs match the attributes of the selected next template, then inserting the selected number of photographs into the template within selected next panel group and rendering the photographs according to the template, else if the attributes of the selected number of photographs do not match the attributes of the selected next panel group, then determining if there is a next template within the selected next panel group;
k. if there is a next template within the selected next panel group, going to step h, else if there is not a next template within the selected next panel group, then going to step a.

2. The method of claim 1, wherein the cells are rectangular and wherein the orientation of the cells may be either portrait or landscape.

3. The method of claim 1, wherein the set of cell attributes further comprise whether the cell includes a caption.

4. The method of claim 1, wherein the set of cell attributes further comprise a height and width.

5. The method of claim 1, wherein the templates further comprise a vertical spacing between cells.

6. The method of claim 5, wherein the vertical spacing between cells within a template is the same for all cells within the template.

7. The method of claim 1, further comprising inserting a horizontal space between rendered templates.

8. The method of claim 1, wherein templates which include two or more cells next to each other further comprise a horizontal spacing between such cells.

9. The method of claim 1, wherein at least one of the panel groups has a width equal to the width of one cell in a template within the at least one panel group.

10. The method of claim 9, wherein the one cell has a landscape orientation.

11. The method of claim 9, wherein the one cell has a portrait orientation.

12. The method of claim 1, wherein at least one of the panel groups has a width equal to the width of two cells in a template within each of the panel groups plus a width of a horizontal space between the two cells in the template.

13. The method of claim 12, wherein the two cells have a landscape orientation.

14. The method of claim 12, wherein the two cells have a portrait orientation.

15. The method of claim 1, wherein panel group 2 comprises four templates.

16. The method of claim 1, wherein panel group 3 comprises ten templates.

17. The method of claim 1, wherein panel group 4 comprises nine templates.

18. The method of claim 1, wherein panel group 5 comprises four templates.

19. The method of claim 1, wherein the layout further comprises a static cell and further comprising inserting the first photograph from the group into the static cell in the layout.

20. A computer system with a computer readable medium comprising instructions which, when executed, perform the method according to claim 1.

\* \* \* \* \*